(12) United States Patent
Hu et al.

(10) Patent No.: US 11,519,837 B2
(45) Date of Patent: Dec. 6, 2022

(54) AUTOMATIC SIMULATION TEST BENCH FOR SIMILAR MATERIALS OF TOP-COAL CAVING MINING AND TEST METHOD THEREOF

(71) Applicant: SHANDONG UNIVERSITY OF SCIENCE AND TECHNOLOGY, Qingdao (CN)

(72) Inventors: Shanchao Hu, Qingdao (CN); Jing Zuo, Qingdao (CN); Jianguo Ning, Qingdao (CN); Jun Wang, Qingdao (CN); Yong Guo, Qingdao (CN); Wenkai Ru, Qingdao (CN)

(73) Assignee: SHANDONG UNIVERSITY OF SCIENCE AND TECHNOLOGY, Qingdao (CN)

(*) Notice: Subject to any disclaimer, the term of this patent is extended or adjusted under 35 U.S.C. 154(b) by 0 days.

(21) Appl. No.: 17/580,358

(22) Filed: Jan. 20, 2022

(65) Prior Publication Data

US 2022/0221384 A1 Jul. 14, 2022

Related U.S. Application Data

(63) Continuation of application No. PCT/CN2020/140242, filed on Dec. 28, 2020.

(51) Int. Cl.
*G01N 3/08* (2006.01)
*G01N 3/02* (2006.01)

(52) U.S. Cl.
CPC ............. *G01N 3/08* (2013.01); *G01N 3/02* (2013.01); *G01N 2203/0048* (2013.01);
(Continued)

(58) Field of Classification Search
CPC .... G01N 3/02; G01N 3/08; G01N 2203/0048; G01N 2203/0067; G01N 2203/0298; G01N 2203/0246
See application file for complete search history.

(56) References Cited

U.S. PATENT DOCUMENTS

2014/0270393 A1   9/2014  Louis et al.
2020/0088907 A1*  3/2020  Feng .................... G01V 99/005
(Continued)

FOREIGN PATENT DOCUMENTS

CN   203658352 U   6/2014
CN   104504988 A   4/2015
(Continued)

OTHER PUBLICATIONS

Hu Shanchao, "Deformation and failure characteristics and mechanism of layered surrounding rock in deep mine roadway", «Chinese Journal of Rock Mechanics and Engineering», vol. 34, Issue 11, Nov. 30, 2015, p. 2376.

*Primary Examiner* — Jonathan M Dunlap

(57) ABSTRACT

The disclosure discloses an automatic simulation test bench and a test method for similar materials of top-coal caving mining. Wherein, the test bench includes a test bench base, a coal seam and strata simulation module, a coal releasing simulation module, a material recovery module, automatic mixing system and a central control system. The disclosure adopts modular construction to meet the requirements of similar material simulation test of top-coal caving mining under different geological conditions and mining technology to the greatest extent. The disclosure adopts automatic control, reduces the working intensity and operation difficulty of the test personnel, and reduces the influence of human factors on the test results. The disclosure adopts a lifting structural design, so as to meet the requirements of
(Continued)

similar simulation test of top-coal caving mining under different mining and caving ratios.

10 Claims, 7 Drawing Sheets

(52) U.S. Cl.
CPC ............... *G01N 2203/0067* (2013.01); *G01N 2203/0246* (2013.01); *G01N 2203/0298* (2013.01)

(56) References Cited

U.S. PATENT DOCUMENTS

2021/0049934 A1* 2/2021 Chen ..................... G01N 3/02
2021/0389500 A1* 12/2021 Chen ..................... B29C 64/10

FOREIGN PATENT DOCUMENTS

| | | |
|---|---|---|
| CN | 207282065 U | 4/2018 |
| CN | 109300378 A | 2/2019 |
| CN | 110006757 A | 7/2019 |
| CN | 209328356 U | 8/2019 |
| CN | 110514806 A | 11/2019 |
| CN | 110596342 A | 12/2019 |
| CN | 210154973 A | 3/2020 |
| WO | 2012162720 A1 | 12/2012 |

* cited by examiner

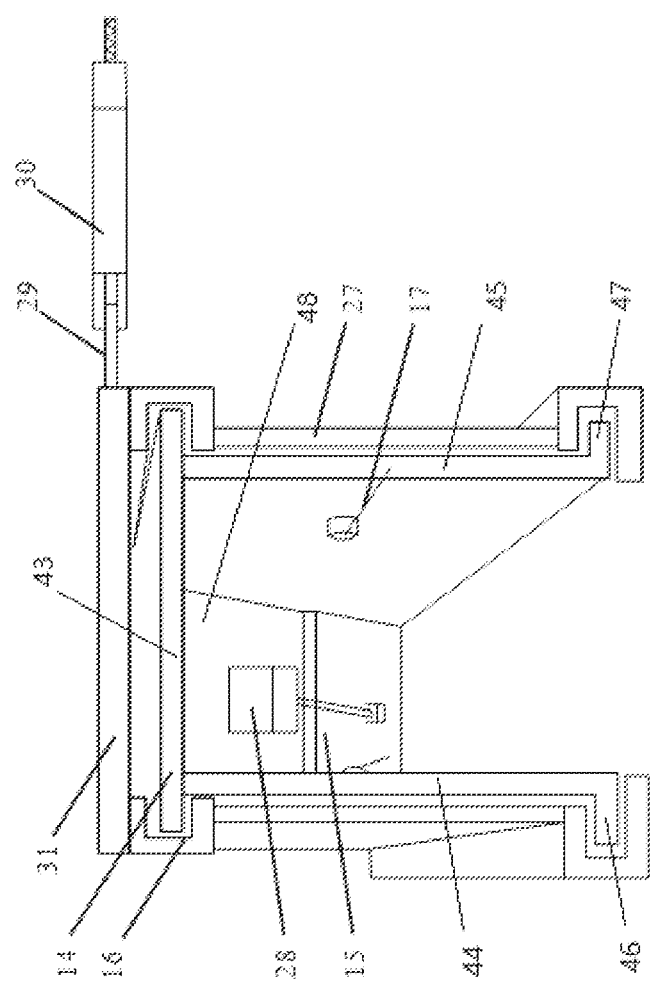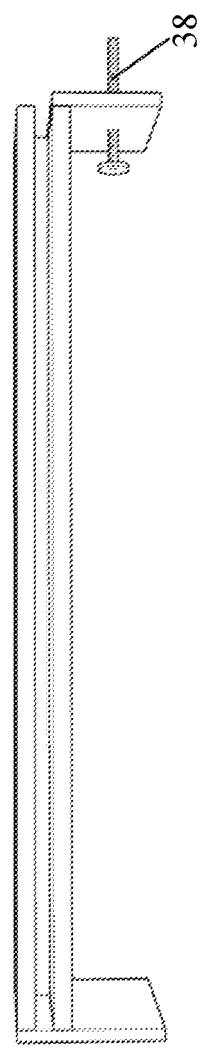
FIG. 3
FIG. 4

AUTOMATIC SIMULATION TEST BENCH FOR SIMILAR MATERIALS OF TOP-COAL CAVING MINING AND TEST METHOD THEREOF

CROSS-REFERENCE TO RELATED APPLICATIONS

This application is a continuation of International Application No. PCT/CN2020/140242 with a filling date of Dec. 28, 2020, designating the United states, now pending, and further claims to the benefit of priority from Chinese Application No. 202011159534.0 with a filing date of Oct. 27, 2020. The content of the aforementioned applications, including any intervening amendments thereto, are incorporated herein by reference.

TECHNICAL FIELD

The disclosure relates to the technical field of indoor similar material test, in particular to an automatic simulation test bench for similar materials of top-coal caving and a test method for similar material simulation test of coal releasing process of top-coal caving mining.

BACKGROUND

At present, top-coal caving mining is a commonly used mining method in underground coal mines in China. Due to top-coal caving mining occurs underground, the flow direction of coal seam and the breakage and displacement of overlying strata during the coal releasing process cannot be directly observed by naked eyes.

Therefore, theoretical research combined with similar material simulation has become an important research means to study the mining regularity of top-coal caving.

The traditional similar material simulation test device mostly studies the migration of cement and weak cement when the equilibrium state is broken up, so it is difficult to carry out effective experimental research on the coal releasing process of top-coal caving.

In addition, the traditional similar material simulation device still has the following defects in practical application.

1. The one-piece structure is mostly adopted, and the application range is small, so it can not meet the simulation tests of different types of similar materials.

2. During the laying of similar materials, the mixing, loading and compaction processes are completed manually, which has some problems, such as difficult operation, long operation time, uneven mixing, long loading time, early cementation of materials, inaccurate compaction thickness of simulated rock stratum and so on.

3. The cement used in the traditional similar material simulation test device is mixed and stirred by fine sand, water and cement. Therefore, it can only simulate the thickness and mechanical parameters of rock stratum, but not the density of coal seam.

SUMMARY OF THE INVENTION

The purpose of the disclosure is to propose an automatic simulation test bench for similar materials of top-coal caving, so as to overcome the technical defect that the traditional similar material simulation test device can not meet the simulation research of top-coal caving releasing coal process.

In order to achieve the above purpose, the disclosure adopts the following technical solution:

An automatic simulation test bench for similar materials of top-coal caving, which includes a test bench base, a coal seam and strata simulation module, a coal releasing simulation module, a material recovery module, an automatic mixing system and a central control system.

The test bench base includes a main frame, a lifting device and a pressurizing device.

Wherein, the main frame is a structure with Chinese character of "囗", and a plurality of module clamping slots are provided on the main frame.

The top of the main frame is provided with a top beam.

There are four groups of the lifting devices, and each group of the lifting devices includes a driving motor, a driving transmission part and a lifting adjustment screw rod.

Wherein, two lifting adjustment screw rods are installed on the left side of the main frame and are respectively located at the front and rear of the left side; The other two lifting adjustment screw rods are installed on the right side of the main frame and are respectively located at the front and rear of the right side.

Each driving motor is respectively arranged on the top beam, and each driving motor is located above a lifting adjustment screw rod.

Each driving motor is respectively connected with the corresponding lifting adjustment screw rod through the driving transmission part.

The pressurizing device is arranged on the top beam and is configured to automatically compact the simulated material and simulate the overburden pressure.

The coal seam and strata simulation module, the coal releasing simulation module and the material recovery module are arranged on the test bench base, and the coal seam and strata simulation module, the coal releasing simulation module and the material recovery module are arranged from top to bottom.

The coal seam and strata simulation module includes the lifting frame, the coal seam and strata simulation module baffle and the coal seam and strata simulation system.

The lifting frame adopts a square frame, wherein the square frame is provided with four sides and is without top and bottom surfaces.

The left and right sides of the lifting frame are respectively installed on each lifting adjustment screw rod in the way of thread nesting.

There are two baffles of coal seam and strata simulation module, and the two baffles of coal seam and strata simulation module are installed at the front and rear sides of the lifting frame respectively; The baffles of each coal seam and strata simulation module is made of transparent acrylic plate.

The coal seam and strata simulation system is laid on the inner side of the lifting frame; Wherein the coal seam and strata simulation system includes the fracture zone simulation layer, the caving zone simulation layer and the top coal simulation layer laid from top to bottom.

The coal releasing simulation module is provided in the corresponding module clamping slot and connected with the main frame through nuts.

The coal releasing simulation module includes the upper structure and the lower structure.

The upper structure includes the insert plate, the automatic insertion and removal device of the insert plate and the roller chute of the insert plate.

Wherein, there are multiple groups of roller chutes of the insert plate, and each group of the roller chutes of the insert plate is detachably installed on the lower structure; each group of the roller chutes of the insert plate is arranged in parallel.

There are a plurality of insert plates, and each of the insert plate extends into one group of the roller chute of the insert plate.

There are a plurality of the automatic insertion and removal devices of the insert plate, and each of the automatic insertion and removal devices of the insert plate is respectively connected with a insert plate; The automatic insert plate insertion and removal device is configured to realize the insertion and removal of the corresponding insert plate.

The lower structure includes the support roller chute, the baffle of the coal releasing simulation module, the support and the traction motor.

Wherein, there are four of the support roller chutes, which are arranged along left-right direction.

There are two baffles of the coal releasing simulation module, and the two baffles are respectively located at the front and rear of the lower structure.

The ach of the baffles of the coal releasing simulation module is arranged along left-right direction.

Wherein, two support roller chutes are respectively installed at the top and bottom of the front side of the baffle of the coal releasing simulation module, and the other two support roller chutes are respectively installed at the top and bottom of the rear side of the baffle of the coal releasing simulation module.

The support is located between the two baffles of the coal releasing simulation modules, and the support is also arranged along left-right direction; Wherein, the front and rear sides of the top of the support and the front and rear sides of the bottom of the support are respectively located in the support roller chute.

The left or right part of the support is provided with a tail beam, wherein the tail beam includes a fixed tail beam and a movable tail beam.

The fixed tail beam is connected with the support and arranged obliquely.

An air cylinder is arranged on the inner surface of the fixed tail beam, wherein the other end of the air cylinder is connected with the movable tail beam.

One side of the tail beam of the support is also provided with a support tail insert plate, and the support tail insert plate is flush with the lowest end of the movable tail beam.

The main frame is provided with a support tail insert plate through hole, and the support tail insert plate extends from the outside of the main frame to the inside of the main frame through the support tail insert plate through hole and is connected with the support.

The traction motor is located outside the main frame and on the opposite side to the tail beam.

The traction motor is connected with the support through the traction rope, and drives the support to move along the support roller chute, wherein the movement direction of the support is perpendicular to the insertion or the removal direction of the insert plate.

The material recovery module is arranged in the corresponding module clamping slot and connected with the main frame through nuts.

The automatic mixing system is located on the outside of the main frame and is configured to realize automatic loading and automatic mixing, and inject the mixed simulation material into the coal seam and strata simulation module.

The central control system adopts the computer, and the driving motor, the pressurizing device, the traction motor, the air cylinder, the automatic insertion and removal device of the insert plate and the automatic mixing system are respectively connected with the computer through lines and controlled by the computer.

In addition, the disclosure also provides a test method for simulation test of similar materials in the coal release process of top-coal caving. The method is based on the automatic simulation test bench of similar materials of top-coal caving, which includes the following steps: a. Commissioning the automatic simulation test bench for similar materials of top-coal caving mining; b. Preparation of simulated the coal seam and rock stratum; c. Simulating the coal releasing process of the top-coal caving mining; d. Handling coal releasing results.

The disclosure has the following advantages:

1. The disclosure adopts modular construction, so it can replace each module of the test bench according to the specific requirements of the simulation test, so as to meet the requirements of the simulation test of materials similar to top-coal caving under different geological conditions and mining technology to the greatest extent.

2. The disclosure adopts automatic control to reduce the manual operation during the simulation test of similar materials of top-coal caving, which not only reduces the working intensity and operation difficulty of the tester, but also reduces the influence of human factors on the test results.

3. The disclosure adopts the lifting structural design, so it can adjust the height of the coal seam and strata simulation module and the coal releasing simulation module according to the actual demand, so as to meet the requirements of the similar simulation test of top-coal caving under the conditions of different mining and caving ratios.

4. The disclosure selects fine sand, gypsum, lime, water and metal powder as the preparation materials of the cement, which overcomes the deficiency that the cement can only simulate the thickness and mechanical parameters of the stratum in the traditional test, and can meet the preparation of strata with different densities.

5. The disclosure adopts industrial stones with different particle sizes to simulate granular media and the material recovery method of layered screening, which can simply and conveniently distinguish top-coal and gangue, and ensure the accuracy of test results.

6. Compared with traditional manual laying of simulated materials, the automatic mixing system of the disclosure accelerates the laying speed of the test, so as to avoid the premature cementation of the simulated material in the laying process, ensuring that the simulated material is well mixed without any lumps.

BRIEF DESCRIPTION OF DRAWINGS

FIG. 3 is a lateral view of the coal releasing simulation module in the embodiment 1 of the present disclosure;

FIG. 4 is a structural diagram of the roller chute of the insert plate in the embodiment 1 of the present disclosure;

Wherein, 1—driving motor, 2—lifting adjustment screw rod, 3—base of the test bench, 4—main oil cylinder, 5—auxiliary oil cylinder, 6—split pressurizing plate, 7—coal seam and strata simulation module, 8—lifting frame, 9—coal seam and strata simulation module baffle, 10—fracture zone simulation layer;

11—caving zone simulation layer, 12—top coal simulation layer, 13—coal releasing simulation module, 14—support, 15—movable tail beam, 16—support roller chute, 17—traction rope, 18—material recovery module, 19—central control system, 20—automatic mixing system;

21—loading bin, 22—mixing bin, 23—laying hose, 24—lifting table, 25—traction motor, 26—signal input and output port, 27—baffle of coal releasing simulation module, 28—air cylinder, 29—insert plate, 30—automatic insertion and removal device of insert plate, 31—detachable roller chute;

I—shaped nut, 33—width adjustment screw rod, 34—insert plate chute, 35—reset spring, 36—motor of insertion and removal device, 37—main screw rod of insertion and removal device, 38—elastic threaded rod, 39—support tail insert plate, 40—main frame;

41—top beam, 42—main pressurizing plate, 43—top plate, 44—front side plate, 45—rear side plate, 46, 47—horizontal flange, 48—fixed tail beam, 49—middle housing, 50, 51—terminal housing, 52—square block, 53—spherical part, 54—spherical groove, 55—line hole, 56—module clamping slot, 57—threaded hole, 58—spherical groove, 59—driving transmission part, 60—plurality of auxiliary oil cylinder mounting holes, 61—support tail insert plate through hole, 62—electric mixing component, 63—fixed point digital camera.

DETAILED DESCRIPTION OF PREFERRED EMBODIMENTS

The disclosure will be further described in detail below in combination with the accompanying drawings and specific embodiments:

Embodiment 1

The disclosure relates to an automatic simulation test bench for similar materials of top-coal caving mining, so as to overcome the technical defect that the traditional similar material simulation test device can not meet the simulation research in coal releasing process of top-coal caving mining.

Figure 1:
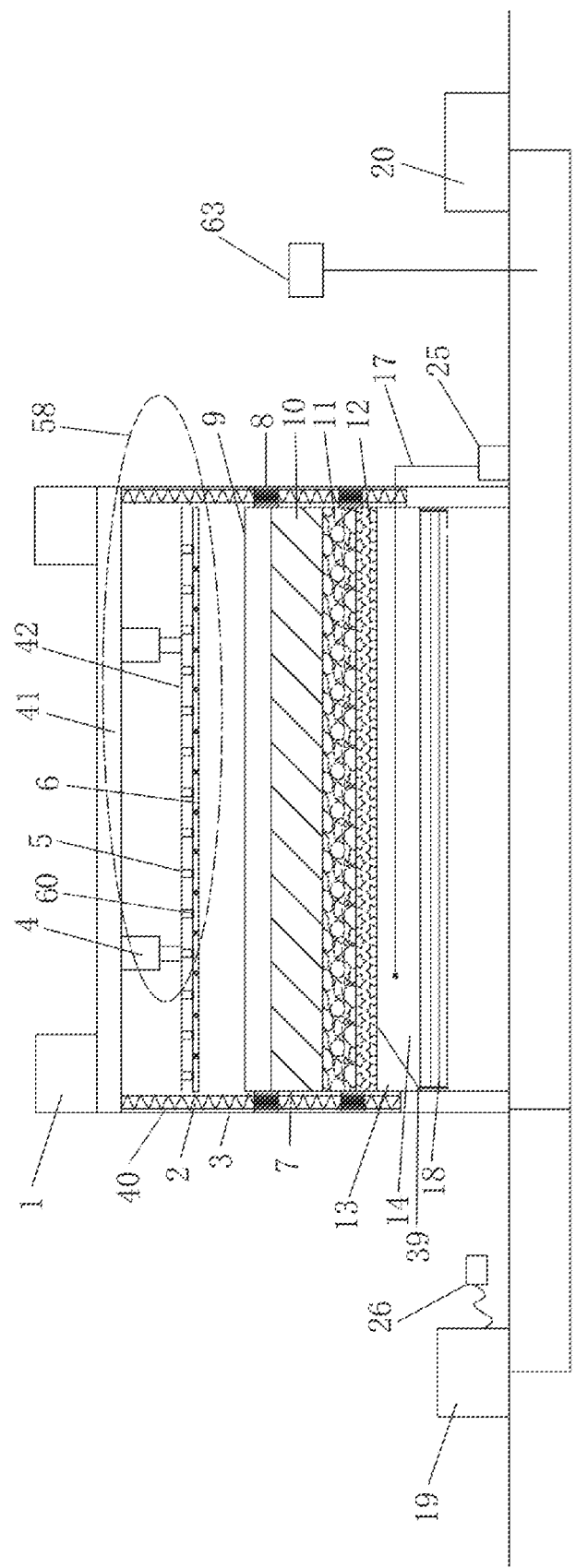
FIG. 1 is a structural diagram of an automatic simulation test bench for similar materials of top-coal caving mining in the embodiment 1 of the present disclosure.

As shown in FIG. 1, the automatic simulation test bench for similar materials of top coal caving mining includes the test bench base 3, the coal seam and strata simulation module 7, the coal releasing simulation module 13, the material recovery module 18, the automatic mixing system 20 and the central control system 19.

First, the direction perpendicular to the paper surface in FIG. 1 (i.e. the direction from the inside of the paper surface to the outside of the paper surface) is defined as the front-to-back direction, then the horizontal direction in the paper surface is the left-right direction, and the vertical direction in the paper surface is the up-down direction.

The test bench base 3 includes the main frame 40, the lifting device and the pressurizing device.

Wherein, the main frame 40 is arranged on the ground and made of high-strength steel. The main frame 40 is a structure with Chinese character of "囗", and the main frame 40 is provided with a line hole 55, a module clamping slot 56, a threaded hole 57, etc.

Wherein, the line hole is used for line routing.

The module clamping slot and the threaded hole are used to realize the installation of the coal releasing simulation module 13, the material recovery module 18, etc.

The above structures on the main frame 40 adopt conventional structures, which will not described for brevity.

The top of the main frame 40 is provided with the top beam 41.

The function of the top beam 41 is to realize the installation of the drive motor 1 and the pressurizing device 58.

As shown in FIG. 1, there are four groups of the lifting devices, and each group of the lifting devices includes the drive motor 1, the driving transmission part 59 and the lifting adjustment screw rod 2.

Wherein there are a total of four lifting adjustment screw rods 2 in the four groups of lifting devices, all of which are installed vertically.

Two lifting adjustment screw rods 2 are installed on the left side of the main frame 40 and are respectively located at the front and rear of the left side. The other two lifting adjustment screw rods 2 are installed on the right side of the main frame 40 and are respectively located at the front and rear of the right side.

Each driving motor 1 is respectively arranged on the top beam 41, and each driving motor 1 is correspondingly located above a lifting adjustment screw rod 2. Each driving motor is respectively connected with the corresponding lifting adjustment screw rod 2 through the driving transmission part.

The driving transmission part in this embodiment adopts, for example, a gear transmission mechanism.

Each drive motor 1 controls each lifting adjustment screw rod 2 through the gear transmission mechanism to realize synchronous rotation.

The above drive motors 1 are connected to the central control system 19 through lines, and the central control system 19 controls the action of the drive motor 1.

The pressurizing device is arranged on the top beam 41 for the automatic compaction of the simulated material and simulation of the overlying strata pressure (or load). The pressurizing device includes a main oil cylinder 4, an auxiliary oil cylinder 5, a main pressurizing plate 42 and a split pressurizing plate 6.

Wherein, there are a plurality of main oil cylinders 4, and each of the main oil cylinders 4 is respectively connected between the top beam 31 and the main pressurizing plate 42.

The main pressurizing plate 42 is made of a complete piece of steel, and a plurality of auxiliary oil cylinder mounting holes 60 are evenly arranged on the main pressurizing plate. There are a plurality of split pressurizing plates 6, and each of the split pressurizing plates 6 is made of homogeneous steel plate.

Each of the split pressurizing plates 6 is arranged in parallel under the main pressurizing plate 42. There are a plurality of the auxiliary oil cylinders 5, and each of the auxiliary oil cylinders 5 is respectively installed between the corresponding auxiliary oil cylinder mounting hole and the split pressurizing plate 6.

Wherein, the main oil cylinder 4 controls the overall movement of the pressurizing device, which can apply a uniform load to the coal seam and strata simulation module 7, and the auxiliary oil cylinder 5 controls the movement of the split pressurizing plate 6 at the bottom, which can apply a local load to the coal seam and strata simulation module 7.

The coal seam and strata simulation module 7, the coal releasing simulation module 13 and the material recovery module 18 are all set on the test bench base 3, and the coal seam and strata simulation module 7, the coal releasing simulation module 13 and the material recovery module 18 are arranged from top to bottom in sequence.

This embodiment adopts modular construction, which is convenient to replace each module according to the specific requirements of the simulation test, so as to meet the requirements of the simulation test of similar materials of top-coal caving mining under different geological conditions and mining technology to the greatest extent.

The coal seam and strata simulation module 7 includes a lifting frame 8, a coal seam and strata simulation module baffle 9 and a coal seam and strata simulation system.

The lifting frame 8 adopts a square frame, which is a cube structure with four sides and no top and bottom surfaces. The left and right sides of the lifting frame 8 are respectively provided with threaded holes corresponding to each lifting adjustment screw rod 2.

The left and right sides of the lifting frame 8 are respectively installed on each lifting adjustment screw rod 2 in the way of thread nesting. The lifting action of the lifting frame 8 is controlled by the (forward or reverse) rotation of the lifting adjustment screw rod 2.

When the lifting adjustment screw rod 2 stops rotating, the lifting frame 8 will not be displaced.

There are two coal seam and strata simulation module baffles 9, and a coal seam and strata simulation module baffle 9 is detachably installed (e.g. nut) at the front and rear side of the lift frame 8.

Wherein, each coal seam and strata simulation module baffle is made of transparent acrylic plate.

The purpose to design the detachable installation of the coal seam and strata simulation module baffle 9 is to facilitate to the replacement of the coal seam and strata simulation module baffle 9 of different specifications and materials according to the test requirements.

The coal seam and strata simulation system is laid on the inner side of the lifting frame; Wherein, the coal seam and strata simulation system includes a fracture zone simulation layer 10, a caving zone simulation layer 11 and a top coal simulation layer 12 laid from top to bottom.

Wherein, the fracture zone simulation layer 10 is made by mixing with fine sand, water, metal powder, gypsum and calcium carbonate in proportion, and then mixing, compacting and drying in turn.

The caving zone simulation layer 11 is formed by laying industrial stones with relatively large diameter.

The top coal simulation layer 12 is formed by laying industrial stones with relatively small diameter.

Wherein, the industrial stones used in the top coal simulation layer and the industrial stones used in the caving zone simulation layer are distinguished by color.

In this embodiment, fine sand, gypsum, lime, water and metal powder are selected as the preparation materials of the cement, which overcomes the deficiency that the cement can only simulate the thickness and mechanical parameters of the rock stratum in the traditional test, so it can meet the preparation of rock stratum with different densities.

The coal releasing simulation module 13 is provided in the corresponding module clamping slot and connected with the main frame 40 through nuts. The joint between coal releasing simulation module 13 and coal seam and strata simulation module 7 is filled with hot-melt adhesive.

Figure 2:
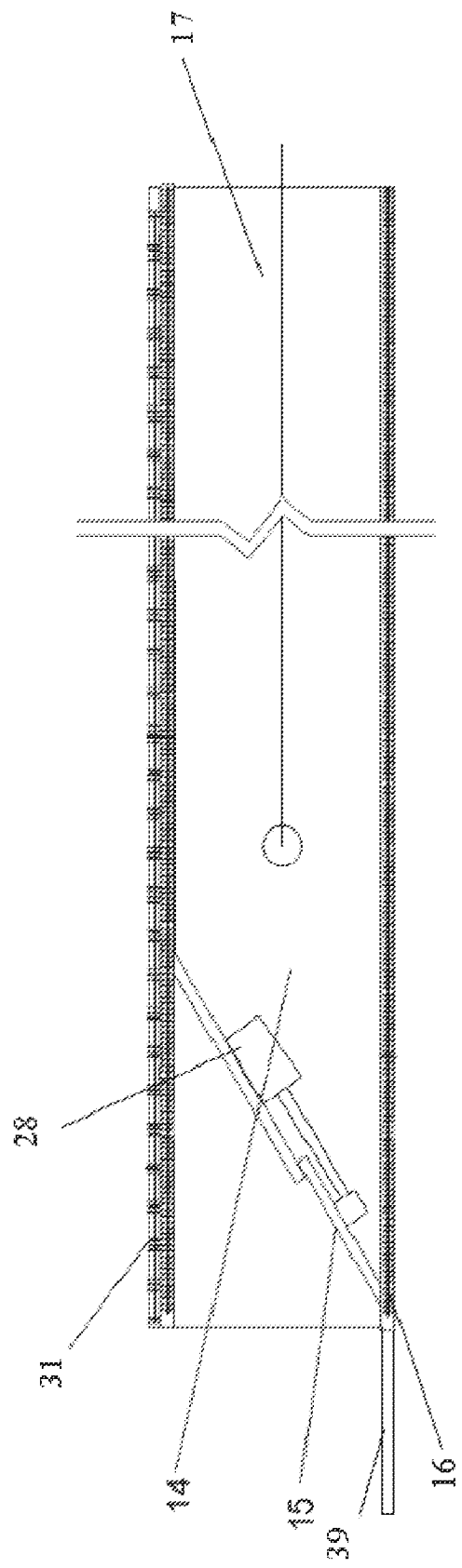
FIG. 2 is a front view of the coal releasing simulation module in the embodiment 1 of the present disclosure.

As shown in FIG. 2 and FIG. 3, the coal releasing simulation module 13 in this embodiment includes the upper structure and the lower structure.

The upper structure includes the insert plate 29, the automatic insertion and removal device of the insert plate 30 and the roller chute of the insert plate 31.

Wherein, there are multiple groups of roller chutes of the insert plate 31, and each group of the roller chutes of the insert plate 31 is detachably installed on the lower structure. Each group of the roller chutes of the insert plate is arranged in parallel.

Wherein, there are two roller chutes of the insert plate 31 in each group and the chutes of the two roller chutes of the insert plate 31 are provided opposite each other; a group of opposite sides of the insert plate 29 are roller chutes of the insert plate 31 respectively.

The purpose of designing the roller chutes of the insert plate to be installed in a detachable way is facilitated to the adaptation of insert plates 29 of different specifications. The insert plate 29 is a thin plate made of homogeneous steel, and its size is determined according to the size of the simulated support.

As shown in FIG. 4, a better structure of the roller chute of the insert plate 31 is shown. It is not difficult to see from FIG. 4 that the end of each roller chute of the insert plate 31 is provided with an adjusting elastic screw rod 38 for realizing the installation of the roller chute of the insert plate 31.

Specifically, by the adjusting elastic screw rod 38, the roller chute of the insert plate can be installed on the support roller chute 16.

There are a plurality of insert plates 29, and each of the insert plate extends into one group of the roller chute of the insert plate 31.

There are a plurality of the automatic insertion and removal devices of the insert plate 30, and each of the automatic insertion and removal devices of the insert plate 30 is respectively connected with a insert plate 29. The automatic insertion and removal device of the insert plate 30 is configured to realize the insertion and removal of the corresponding insert plate 29.

Specifically, two small holes are reserved in the connection end of the insert plate 29 for connecting with the automatic insertion and removal device of the insert plate 30, and the automatic insertion and removal device of the insert plate 30 and the insert plate 29 are connected and fixed by threads.

In order to realize the sliding of the insert plate 29, the upper and lower rows of cylindrical rollers are arranged in parallel in the roller chute of the insert plate 31.

Figure 5:
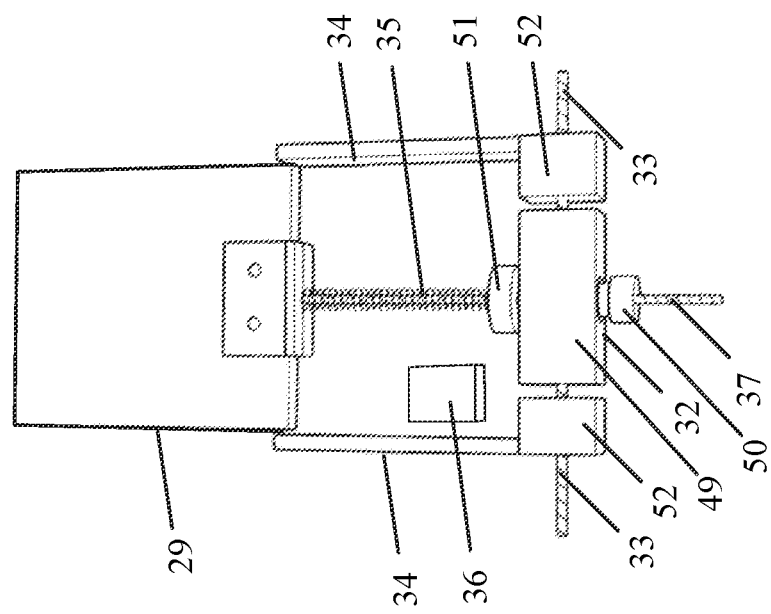
FIG. 5 is a structural diagram of the automatic insertion and removal device of the insert plate in the embodiment 1 of the present disclosure.

As shown in FIG. 5, the automatic insertion and removal device of the insert plate 30 includes a motor of insertion and removal device 36, an I-shaped nut 32, a main screw rod of insertion and removal device 37, an insert plate chute 34, a width adjustment screw rod 33 and a reset spring 35.

Wherein, the motor of insertion and removal device 36 is connected with the I-shaped nut 32 through the gear transmission part, and drives the I-shaped nut 32 to rotate. The gear transmission part is a conventional structure, which is not discussed in detail in this embodiment.

In this embodiment, the I-shaped nut 32 has a bearing structure in the middle housing 49, a gear structure in the two terminal housings and a threaded hole structure in the centre, which can be freely rotated in automatic insertion and removal device of insert plate.

In FIG. 5, the two terminal housings are the terminal housing 50 and the terminal housing 51 in the figure. The gear structure of the terminal housing 50 and the terminal housing 51 is connected with the motor of insertion and removal device 36 through the gear transmission part.

One end of the main screw rod of insertion and removal device 37 is connected with the insert plate 29, and the other end (the free end, as shown in FIG. 3) of the main screw rod of insertion and removal device 37 through the threaded hole in the center of the I-shaped nut 32 in a threaded nested manner.

There are two insert plate chutes 34, which are arranged opposite each other, and the two insert plate chutes 34 are used to clamp the insert plate 29.

The two insert plate chutes 34 have the same structure. Take one of the insert chute 34 as an example:

A square block 52 with a threaded hole is arranged at the end of the insert plate chute 34 (one end close to the I-shaped nut 32). There are two width adjustment screw rods 33, and each width adjustment screw rod 33 corresponds to one insert plate chute 34.

Figure 6:
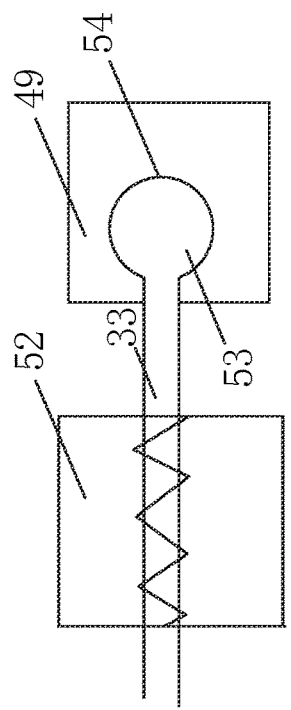
FIG. 6 is a schematic diagram of the matching of the width adjustment screw rod and the square block in the embodiment 1 of the present disclosure.

As shown in FIG. 6, a spherical part 53 is arranged at one end of the width adjustment screw rod 33, a spherical groove 54 corresponding to the spherical part 53 is arranged on the middle housing 49, and the spherical part 53 extends into the spherical groove 54.

The other end of the width adjustment screw rod 33 is a free end, and the free end of the width adjustment screw rod 33 passes through the square block 52.

By manually rotating the two width adjustment screw rods 33 (the free end) with the help of a tool, the width between the two insert plate chutes 34 can be adjusted to meet the requirements of insert plates 29 of different sizes.

The reset spring 35 is sleeved on the rod body of the main screw rod of insertion and removal device 37 between the I-shaped nut 32 and the insert plate 29. The function of the reset spring 35 is to help the insert plate 29 rapidly reset.

When it is necessary to pull out the insert plate 29, the motor of insertion and removal device 36 rotates forward with the I-shaped nut 32, and the main screw rod of insertion and removal device 37 pulls the insert plate 29 to move in the direction of the I-shaped nut 32. At this time, the reset spring 35 generates deformation and accumulates kinetic energy.

When the insert plate 29 needs to be inserted back, the motor of insertion and removal device 36 reverses to drive the I-shaped nut 32 to rotate, the main screw rod of insertion and removal device 37 pulls the insert plate 29 away from the I-shaped nut 32, and the reset spring 35 restores deformation and releases kinetic energy.

The lower structure includes the support roller chute 16, the baffle of coal releasing simulation module 27, the support 14 and the traction motor 25.

Wherein, there are four support roller chutes 16, all along the long side of the lower structure, that is, left-right direction shown in FIG. 1. The internal structure of each support roller chute 16 is two rows of cylindrical rollers arranged in parallel.

There are two baffles of coal releasing simulation module 27, which are respectively located at the front and rear sides of the lower structure. Each baffle of coal releasing simulation module 27 is arranged along left-right direction and forms a cuboid space with the left and right sides of the test bench base.

Wherein, two support roller chutes 16 are respectively installed at the top and bottom of the front baffle of coal releasing simulation module 27, and the other two support roller chutes 16 are respectively installed at the top and bottom of the rear baffle of coal releasing simulation module 27.

The support 14 is located between the two baffles of coal releasing simulation module 27, and the support is also arranged in left-right direction. Wherein, the front and rear sides of the top of the support and the front and rear sides of the bottom of the support are respectively located in a support roller chute.

The joint between the support 14 and the support roller chute 16 is filled with hot-melt adhesive.

Specifically, the support 14 includes a top plate 43, a front side plate 44 and a rear side plate 45.

Wherein, the top plate 43 is connected to the front side plate 44 and the top plate 43 to the rear side plate 45. The bottom of the front side plate 43 is provided with a forward extending horizontal flange 46, and the bottom of the rear side plate is provided with a backward extending horizontal flange 47.

The front side part, the rear side part and the two horizontal flanges of the top plate 43 are respectively located in a support roller chute 16.

As shown in FIG. 1, the left side of the support 14 is provided with a tail beam, wherein the tail beam includes a fixed tail beam 48 and a movable tail beam 15.

The fixed tail beam 48 is connected to the support 14 and is arranged obliquely.

An air cylinder 28 is arranged on the inner surface of the fixed tail beam 48, wherein the other end of the air cylinder 28 is connected with the movable tail beam 15. The air cylinder 28 is connected to the signal input and output port 26 of the central control system 19 through a line.

The air cylinder 28 receives instructions from the central control system 19 through the signal input and output port 26.

One side part (such as the left part) of the tail beam is arranged on the support 14, and a support tail insert plate 39 is also provided, which is flush with the lowest end of the movable tail beam 15.

The main frame 40 is provided with a support tail insert plate through hole 61 and the support tail insert plate 39 extends from the outside of the main frame 40 through the support tail insert plate through hole to the inside of the main frame and is connected with the support 14.

The length of the support tail insert plate 39 is determined according to the simulation solution of the simulation test.

The traction motor 25 is located on the outside of the main frame 40 and on the opposite side to the tail beam, such as the right side in FIG. 1.

The traction motor 25 is connected with the support 14 through the traction rope 17, and drives the support 14 to move along the support roller chute. Wherein, the movement direction of the support 14 is perpendicular to the insertion direction or the removal direction of the insert plate 29.

Of course, the support tail insert plate 39 can also be located on the right side of the support 14, and similarly, the traction motor 25 is located on the left.

As can be easily seen from FIG. 3, the support 14 adopts a bottomless structure, so as to facilitate the fallen industrial stones into the material recovery module 18.

The material recovery module 18 is arranged in the corresponding module clamping slot and is connected with the main frame 40 through nuts. The joint between the material recovery module 18 and the coal releasing simulation module 13 is filled with hot-melt adhesive.

The material recovery module 18 adopts a drawer type structure; The material recovery module 18 is composed of multi-layer screens, the screen aperture is determined according to the particle sizes of the caving zone simulation layer 11 and the top coal simulation layer 12, and the screen aperture of each layer gradually decreases from top to bottom.

The embodiment adopts the material recovery method of simulating dispersion of industrial stones with different particle sizes and layered screening, which can simply and conveniently distinguish top-coal and gangue, and ensure the accuracy of test results.

The automatic mixing system 20 is located on the outside of the main frame 40 and is used to realize automatic loading and automatic mixing, and inject the mixed simulation material into the coal seam and strata simulation module 7.

Figure 7:
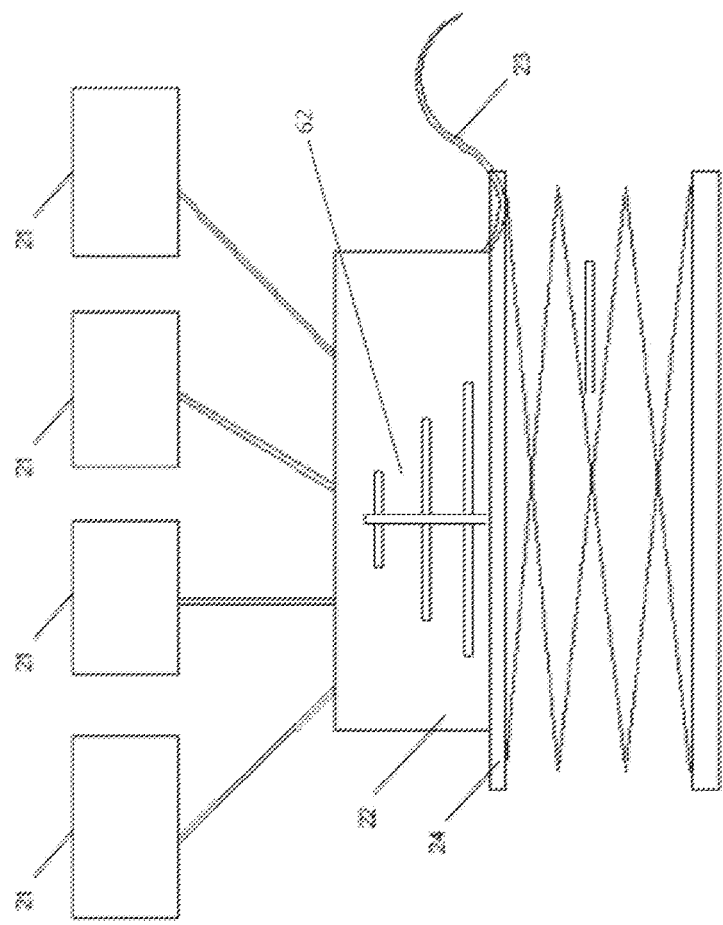
FIG. 7 is a structural diagram of the automatic mixing system in the embodiment 1 of the present disclosure.

As shown in FIG. 7, the automatic mixing system 20 includes a loading bin 21, a mixing bin 22, a laying hose 23 and a lifting table 24.

There are several loading bins 22, and the bottom of each loading bin 22 is equipped with a valve and a weighing device, so it can real-time monitoring of the remaining material in each bin 22 to control the flow rate.

The mixing bin 22 is located below each loading bin 21, and the loading bin 21 and the mixing bin 22 are installed on the lifting table 24.

The bottom of each loading bin 21 is respectively connected to the feed inlet of the mixing bin 22 through the material transfer hose. An electric mixing component 62 is arranged inside the mixing bin to realize the automatic mixing of materials.

The electric mixing component is connected with the central control system 19 through a line and controlled by the central control system 19.

The laying hose 23 is arranged at the bottom outlet of the mixing bin 22 for injecting simulation materials into the coal seam and strata simulation module.

The lifting table 24 adopts a hydraulic lifting device.

In this embodiment, the automatic mixing system 20 includes a manual control and a central control system control, and the manual control has the highest priority.

In this embodiment, the approximate working process of the automatic mixing system 20 is as follows:

The lift table 24 is lowered when the loading bin 21 needs to be loaded, and the lift table 24 is raised when the loading is finished.

The bottom of the loading bin 21 is equipped with a valve and a weighing device. The data obtained by the weighing device can be transmitted to the central control system 19 in real-time, and the weight of the remaining material obtained by subtracting the weight of the required material from the total weight is input to the central control system 19.

The central control system 19 controls the flow of the valve by monitoring the dynamic data on the weighing device in real-time.

The mixing bin 22 is arranged below the loading bin 21, and the two are connected by hose. The materials discharged through the valve of the loading bin 21 enter into the mixing bin 22 by gravity, and the material is automatically mixed after it all enters the mixing bin 22.

After mixing, the mixing bin 22 pours the materials into the laying hose 23. The materials flow out of the other end of the laying hose 23 by gravity, and the tester moves the laying hose 23 to lay the material evenly in the coal seam and strata simulation module 7.

The pressurizing device automatically compacts the simulated material. Before laying the material, the pressurizing device is moved to the appropriate position, setting this position as the origin, and then the pressurizing system is reset after setting the origin, and automatically control the compaction thickness of the pressurizing system according to the set origin.

The central control system 19 adopts a computer. All ports of the central control system 19 are integrated on the signal input and output port 26. The signal input and output port 26 is a signal translation device, which can translate the instructions of the central control system into electrical signals and send them to the target equipment.

The drive motor 1, the pressurizing device, the traction motor 25, the air cylinder 28, the automatic insertion and removal device of insert plate 30 and the automatic mixing system 20 are respectively connected to the computer through lines, and are remotely controlled and automatically operated by the computer.

The automatic simulation test bench for similar materials of top-coal caving mining described in the embodiment 1 overcomes the problems that the traditional similar material simulation test bench is not suitable for the simulation research of top-coal caving mining in coal releasing process, the similar material simulation test bench has small application scope, difficult laying, and the simulated rock stratum does not consider the rock density, and the coal releasing process of top-coal caving mining is restored to the greatest extent in the laboratory environment.

Embodiment 2

The embodiment 2 describes a test method for simulation test of similar materials in the coal releasing process of top-coal caving mining. The test method is based on the automatic simulation test bench of similar materials in top-coal caving mining described in the embodiment 1 above.

Figure 8:
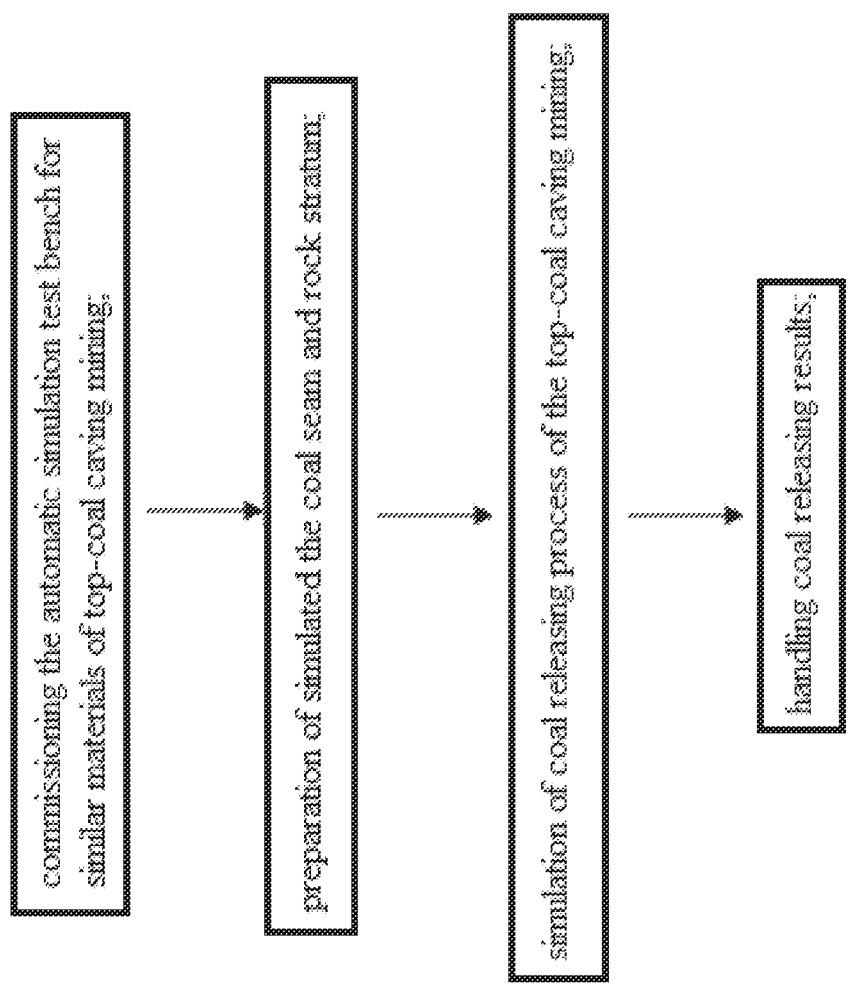
FIG. 8 is a flow chart of the test method of the similar material simulation test in the coal releasing process of the top-coal caving mining in the embodiment 2 of the present disclosure.
Figure 9:
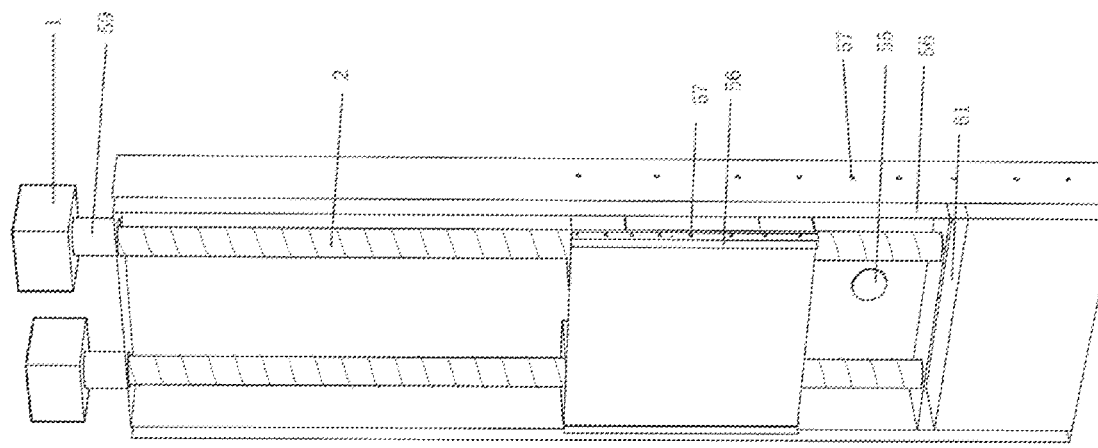
FIG. 9 is a structural diagram of the lifting device in the embodiment 1 of the present disclosure.

As shown in FIG. 8, the test method of similar material simulation test in the coal releasing process of top-coal caving mining includes the following steps:

a. Commissioning the automatic simulation test bench for similar materials of top-coal caving mining.

Adjusting a height of a coal seam and strata simulation module 7 according to a selected mining and caving ratio, installing a coal releasing simulation module 13 with corresponding height, installing a matching support 14 according to a selected simulation solution, and putting required materials into a loading bin of an automatic mixing system.

b. Preparation of simulated the coal seam and rock stratum.

Determining specifications of selected industrial stones according to actual data of coal and gangue measured at a working face of a simulated mining area and a scaling ratio of the simulation test, wherein the industrial stones selected for the gangue and the coal seam have obvious distinction in color.

Calculating the heights of the caving zone and the fracture zone according to the three zones discrimination method, wherein:

The height of the caving zone is calculated according to the formula:

$$H_m \beta m \beta / (k-1) \cos \alpha;$$

Wherein, m is the thickness of the coal seam, β is the recovery rate of the working face with top-coal caving mining, K is the dilatancy coefficient of caved rock, α is the dip angle of the coal seam, and $H_m$ is the height of caving zone.

The height of the fracture zone is calculated according to the formula:

$$H_L = {}^{+\sqrt{m\beta}+10};$$

Wherein, $H_L$ is the height of the fracture zone, m is the thickness of coal seam, β is the recovery rate of the working face with top-coal caving mining.

Determining rock stratum contained in the caving zone and the fracture zone according to the calculated the heights of the caving zone and the fracture zone compared with an isomorphic histogram of the rock stratum.

Wherein, industrial stones are selected as the preparation material for the caving zone simulation layer 11 and the top coal simulation layer 12; the industrial stones are laid directly or mixed fully with weak cementing agent.

Selecting fine sand, metal powder, gypsum, calcium carbonate and water as the preparation materials for the rock stratum of the fracture zone simulation layer 10, and these preparation materials are laid after thoroughly mixed.

Recording the quality of each material used during preparation, and using mica powder for layering between rock stratum.

c. Simulate coal releasing process of the top-coal caving mining;

When simulating the coal releasing process of top-coal caving mining along the working face direction, the support 14, the traction motor 25 and the traction rope 17 are not assembled in the coal releasing simulation module, the width of the insert plate 29 is calculated according to the center distance of the working face support and the similarity ratio of simulation test.

Pulling out the insert plate in sequence according to the simulated coal releasing mode. Resetting the insert plate 29 which is pulled out when observing that there are industrial stones with large diameter in the material recovery module 18, and then pulling out the next insert plate.

When simulating the coal releasing process of top-coal caving mining in the advancing direction, calculating a size of the support according to a size of the working face support and the similarity ratio of simulation test, and calculating the width of the insert plate 29 according to a working face footage and the similarity ratio of simulation test.

When releasing coal, pulling the support 14 to the designated position by the traction motor 25, pulling out the insert plate 29 above the support 14, pushing the movable tail beam 15 into the fixed tail beam by the air cylinder 28, driving the movable tail beam to reset by the air cylinder after observing the presence of larger diameter industrial stones in the material recovery module, wherein the insert plate does not need to be reset, and pulling the support 14 to move to the next designated position by the traction motor 25.

Pulling out the screens in the material recovery module 18 to recover fallen material and weighing the fallen material recovered.

Using a fixed point digital camera 63 for photographing in the process of coal releasing.

d. Handling coal releasing results;

Calculating the coal releasing rate of top-coal caving mining according to the weighing during laying and the weighing during coal releasing.

Calculating the gangue contain rate of top-coal caving mining according to the weight of industrial stones with different diameters.

Obtaining the migration law of the coal seam and rock stratum of top coal caving and the subsidence and fracture law of the overlying rock stratum according to pictures taken by the digital camera.

The test method of similar material simulation test in the coal releasing process of the top-coal caving mining described in the embodiment well meets the requirements of similar material simulation test of top-coal caving mining under different geological conditions and mining technology.

The above are merely preferred embodiments of the present invention and are not intended to limit the present invention. The present invention may be subject to changes and variations for those skilled in the art. Any modifications, equivalent replacements, and improvements made within the spirit and principles of the present invention shall all be encompassed in the protection scope of the present invention.

What is claimed is:

1. An automatic simulation test bench for similar materials of top-coal caving, comprising a test bench base, a coal seam and strata simulation module, a coal releasing simulation module, a material recovery module, an automatic mixing system and a central control system;

the test bench base comprises a main frame, a lifting device and a pressurizing device;

wherein a plurality of module clamping slots are provided on the main frame;

a top of the main frame is provided with a top beam;

there are four groups of the lifting devices, and each group of the lifting devices comprises a driving motor, a driving transmission part and a lifting adjustment screw rod;

wherein two lifting adjustment screw rods are installed on a left side of the main frame and are respectively located at the front and rear of the left side; the other two lifting adjustment screw rods are installed on a right side of the main frame and are respectively located at the front and rear of the right side;

each driving motor is respectively arranged on the top beam, and each driving motor is located above a lifting adjustment screw rod;

each driving motor is respectively connected with the corresponding lifting adjustment screw rod through the driving transmission part;

the pressurizing device is arranged on the top beam and is configured to automatically compact simulated material and simulate an overburden pressure;

the coal seam and strata simulation module, the coal releasing simulation module and the material recovery module are arranged on the test bench base, and the coal seam and strata simulation module, the coal releasing simulation module and the material recovery module are arranged from top to bottom;

the coal seam and strata simulation module comprises a lifting frame, a coal seam and strata simulation module baffle and a coal seam and strata simulation system;

the lifting frame adopts a square frame, wherein the square frame is provided with four sides and is without top and bottom surfaces;

the left and right sides of the lifting frame are respectively installed on each lifting adjustment screw rod in a way of thread nesting;

there are two baffles of the coal seam and strata simulation module, and the two baffles of the coal seam and strata simulation module are installed at the front and rear sides of the lifting frame respectively; the baffles of each coal seam and strata simulation module is made of transparent acrylic plate;

the coal seam and strata simulation system is laid on an inner side of the lifting frame; wherein the coal seam and strata simulation system comprises a fracture zone simulation layer, a caving zone simulation layer and a top coal simulation layer laid from top to bottom;

the coal releasing simulation module is provided in the corresponding module clamping slot and connected with the main frame through nuts;

the coal releasing simulation module comprises a upper structure and a lower structure;

the upper structure comprises an insert plate, an automatic insertion and removal device of the insert plate and a roller chute of the insert plate;

wherein there are multiple groups of roller chutes of the insert plate, and each group of the roller chutes of the insert plate is detachably installed on the lower structure; each group of the roller chutes of the insert plate is arranged in parallel;

there are a plurality of insert plates, and each of the insert plate extends into one group of the roller chute of the insert plate;

there are a plurality of the automatic insertion and removal devices of the insert plate, and each of the automatic insertion and removal devices of the insert plate is respectively connected with a insert plate; the automatic insert plate insertion and removal device is configured to realize the insertion and removal of the corresponding insert plate;

the lower structure comprises a support roller chute, a baffle of the coal releasing simulation module, a support and a traction motor;

wherein, there are four of the support roller chutes, which are arranged along left-right direction;

there are two baffles of the coal releasing simulation module, and the two baffles are respectively located at the front and rear of the lower structure;

each of the baffles of the coal releasing simulation module is arranged along left-right direction;

wherein, two support roller chutes are respectively installed at the top and bottom of the front side of the baffle of the coal releasing simulation module, and the other two support roller chutes are respectively installed at the top and bottom of the rear side of the baffle of the coal releasing simulation module;

the support is located between the two baffles of the coal releasing simulation module, and the support is also arranged along left-right direction; wherein the front and rear sides of the top of the support and the front and rear sides of the bottom of the support are respectively located in the support roller chute;

the left or right part of the support is provided with a tail beam, wherein the tail beam comprises a fixed tail beam and a movable tail beam;

the fixed tail beam is connected with the support and arranged obliquely;

an air cylinder is arranged on an inner surface of the fixed tail beam, wherein an other end of the air cylinder is connected with the movable tail beam;

one side of the tail beam of the support is also provided with a support tail insert plate, and the support tail insert plate is flush with the lowest end of the movable tail beam;

the main frame is provided with a support tail insert plate through hole, and the support tail insert plate extends from an outside of the main frame to an inside of the main frame through the support tail insert plate through hole and is connected with the support;

the traction motor is located outside the main frame and on an opposite side to the tail beam;

the traction motor is connected with the support through a traction rope, and drives the support to move along the support roller chute, wherein a movement direction of the support is perpendicular to an insertion direction or a removal direction of the insert plate;

the material recovery module is arranged in the corresponding module clamping slot and connected with the main frame through nuts;

the automatic mixing system is located on the outside of the main frame and is configured to realize automatic loading and automatic mixing, and inject mixed simulation material into the coal seam and strata simulation module;

the central control system adopts the computer, and the driving motor, the pressurizing device, the traction motor, the air cylinder, the automatic insertion and removal device of the insert plate and the automatic mixing system are respectively connected with the computer through lines and controlled by the computer.

2. The automatic simulation test bench for similar materials of top-coal caving according to claim 1, wherein the pressurizing device comprises a main oil cylinder, an auxiliary oil cylinder, a main pressurizing plate and a split pressurizing plate;

wherein there are a plurality of main oil cylinders, and each of the main oil cylinders is respectively connected between the top beam and the main pressurizing plate;

a plurality of auxiliary oil cylinder mounting holes are evenly arranged on the main pressurizing plate;

there are a plurality of split pressurizing plates, and each of the split pressurizing plates is arranged under the main pressurizing plate in parallel;

there are a plurality of auxiliary oil cylinders, and each of the auxiliary oil cylinders is respectively installed between the corresponding auxiliary oil cylinder mounting hole and the split pressurizing plate.

3. The automatic simulation test bench for similar materials of top-coal caving according to claim 1, wherein the fracture zone simulation layer is made by mixing fine sand, water, metal powder, gypsum and calcium carbonate in proportion, and then mixing, compacting and drying in turn;

the caving zone simulation layer is formed by laying industrial stones with relatively large diameter;

the top coal simulation layer is formed by laying industrial stones with relatively small diameter;

wherein the industrial stones used in the top coal simulation layer and the industrial stones used in the caving zone simulation layer are distinguished by color.

4. The automatic simulation test bench for similar materials of top-coal caving according to claim 1, wherein the support comprises a top plate, a front side plate and a rear side plate, wherein the top plate is respectively connected with the front side plate and the rear side plate;

a horizontal flange extending forward is provided at a bottom of the front side plate, and a horizontal flange extending backward is provided at a bottom of the rear side plate;

a front side part and a rear side part of the top plate and the two horizontal flanges are respectively located in the support roller chute.

5. The automatic simulation test bench for similar materials of top coal caving according to claim 1, wherein each group of the roller chute of the insert plate is respectively detachably installed on the support roller chute;

wherein, there are two roller chutes of the insert plate in each group and the notches of the two roller chutes of the insert plate are provided opposite each other; opposite sides in one group of the insert plate are located in the roller chutes of the insert plate respectively;

the end of each of the roller chutes of the insert plate is provided with an adjusting elastic screw rod for realizing the installation of the roller chute of the insert plate.

6. The automatic simulation test bench for similar materials of top-coal caving according to claim 1, wherein an upper row and a lower row of cylindrical rollers arranged in parallel are provided in the roller chute of the insert plate.

7. The automatic simulation test bench for similar materials of top-coal caving mining according to claim 1, wherein the automatic insertion and removal device of the insert plate comprises a motor of the insertion and removal device, an I-shaped nut, a main screw rod of the insertion and removal device, an insert plate chute, a width adjustment screw rod and a reset spring;

wherein, the motor of the insertion and removal device is connected with the I-shaped nut through a gear transmission part, and the I-shaped nut is driven to rotate;

the I-shaped nut is provided with a bearing structure in the middle housing, a gear structure in the two terminal housings and a threaded hole structure in the centre, freely rotating in the automatic insertion and removal device of the insert plate;

one end of the main screw rod of the insertion and removal device is connected with the insert plate, and the other end of the main screw rod of the insertion and removal device passes through the threaded hole in the center of the I-shaped nut in a way of thread nesting;

there are two insert plate chutes and are arranged opposite each other, the insert plate chutes are configured to clamp the insert plate;

the width adjustment screw rod is configured to adjust a width between the two insert plate chutes;

the reset spring is arranged on a part rod body of the main screw rod of the insertion and removal device between the I-shaped nut and the insert plate.

8. The automatic simulation test bench for similar materials of top-coal caving mining according to claim 1, wherein the material recovery module adopts a drawer type structure;

the material recovery module is composed of multiple layers of screens, and an aperture of each layer of the screens gradually decreases from top to bottom.

9. The automatic simulation test bench for similar materials of top-coal caving mining according to claim 1, wherein the automatic mixing system comprises a loading bin, a mixing bin, a laying hose and a lifting table;

wherein there are a plurality of the loading bins, and a bottom of each of the loading bins is equipped with a valve and a weighing device;

the mixing bin is located below each of the loading bins and installed on the lifting table;

the bottom of each of the loading bins is respectively connected to a feeding port of the mixing bin through material transfer hoses;

an electric mixing component is arranged inside the mixing bin, wherein the laying hose is arranged at a bottom of an output port of the mixing bin and is configured to inject simulation materials into the coal seam and strata simulation module.

10. A test method for simulation test of similar materials in a coal releasing process of the top-coal caving mining, which is based on the automatic simulation test bench of similar materials in top-coal caving mining according to any one of claim 1, the method comprises:

a. commissioning the automatic simulation test bench for similar materials of top-coal caving mining;

adjusting a height of a coal seam and strata simulation module according to a selected mining and caving ratio, installing a coal releasing simulation module with corresponding height, installing a matching simulation support according to a selected simulation solution, and putting required materials into a loading bin of an automatic mixing system;

b. preparation of simulated the coal seam and rock stratum;

determining specifications of selected industrial stones according to actual data of coal and gangue measured at a working face of a simulated mining area and a scaling ratio of the simulation test, wherein the industrial stones selected for the gangue and the coal seam have obvious distinction in color;

calculating heights of a caving zone and a fracture zone according to three zones discrimination method, wherein the height of the caving zone is calculated according to the formula: $H_m = m\beta/(k-1)\cos\alpha$ wherein, m is a thickness of the coal seam, $\beta$ is a recovery rate of the working face with top-coal caving mining, k is a dilatancy coefficient of caved rock, $\alpha$ is a dip angle of the coal seam, and $H_m$ is the height of the caving zone;

the height of the fracture zone is calculated according to the formula: $H_L = 30\sqrt{m\beta} + 10$;

wherein, $H_L$ is the height of the fracture zone, m is the thickness of coal seam, $\beta$ is the recovery rate of the working face with top-coal caving mining;

determining rock stratum contained in the caving zone and the fracture zone according to the calculated heights of the caving zone and the fracture zone compared with an isomorphic histogram of the rock stratum;

wherein, industrial stones are selected as preparation material for a caving zone simulation layer and a top coal simulation layer; the industrial stones are laid directly or mixed fully with weak cementing agent;

selecting fine sand, metal powder, gypsum, calcium carbonate and water as preparation materials for the rock stratum of the fracture zone simulation layer, and these preparation materials are thoroughly mixed and laid;

recording a quality of each material used during preparation, and using mica powder for layering between rock stratum;

c. simulation of coal releasing process of the top-coal caving mining;

when simulating the coal releasing process of top-coal caving mining along the working face direction, a support, the traction motor and the traction rope are not assembled in the coal releasing simulation module, a width of the insert plate is calculated according to a center distance of a working face support and a similarity ratio of simulation test;

pulling out the insert plate in sequence according to a simulated coal releasing mode; resetting the insert plate which is pulled out when observing that there are industrial stones with large diameter in the material recovery module, and then pulling out the next insert plate;

when simulating the coal releasing process of top-coal caving mining in the advancing direction, calculating a size of the support according to a size of the working face support and the similarity ratio of simulation test, and calculating the width of the insert plate according to a working face footage and the similarity ratio of simulation test;

when releasing coal, pulling the support to the designated position by the traction motor, pulling out the insert plate above the support, pushing the movable tail beam into the fixed tail beam by the air cylinder, driving the movable tail beam to reset by the air cylinder after observing the presence of larger diameter industrial stones in the material recovery module, wherein the insert plate does not need to be reset, and pulling the support to move to the next designated position by the traction motor;

pulling out the screens in the material recovery module to recover fallen material and weighing the fallen material recovered;

using a fixed point digital camera for photographing in the process of coal releasing;

d. handling coal releasing results;

calculating the coal releasing rate of top-coal caving mining according to the weighing during laying and the weighing during coal releasing;

calculating the gangue contain rate of top-coal caving mining according to the weight of industrial stones with different diameters;

obtaining a migration law of the coal seam and rock stratum of top coal caving and the subsidence and fracture law of the overlying rock stratum according to pictures taken by the digital camera.

* * * * *